(12) United States Patent
Jamshidi-Roudbari et al.

(10) Patent No.: US 10,852,876 B2
(45) Date of Patent: Dec. 1, 2020

(54) NARROW BORDER TOUCH SCREEN

(71) Applicant: Apple Inc., Cupertino, CA (US)

(72) Inventors: Abbas Jamshidi-Roudbari, Sunnyvale, CA (US); Cheng-Ho Yu, Cupertino, CA (US); Shih-Chang Chang, Cupertino, CA (US); Ting-Kuo Chang, Hsinchu (TW)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/313,942

(22) PCT Filed: Sep. 23, 2014

(86) PCT No.: PCT/US2014/057032
§ 371 (c)(1),
(2) Date: Nov. 23, 2016

(87) PCT Pub. No.: WO2015/183334
PCT Pub. Date: Dec. 3, 2015

(65) Prior Publication Data
US 2017/0199618 A1 Jul. 13, 2017

Related U.S. Application Data

(60) Provisional application No. 62/004,093, filed on May 28, 2014.

(51) Int. Cl.
*G06F 3/045* (2006.01)
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01); *G06F 2203/04104* (2013.01); *G06F 2203/04108* (2013.01)

(58) Field of Classification Search
CPC ....... G06F 3/0412; G06F 3/044; G06F 3/0416
See application file for complete search history.

(56) References Cited

U.S. PATENT DOCUMENTS

| | | |
|---|---|---|
| 4,542,960 A | 9/1985 | Yang |
| 4,916,308 A | 4/1990 | Meadows |

(Continued)

FOREIGN PATENT DOCUMENTS

| | | |
|---|---|---|
| CN | 102193253 A | 9/2011 |
| CN | 103488332 A | 1/2014 |

(Continued)

OTHER PUBLICATIONS

Final Office Action dated Jul. 14, 2011, for U.S. Appl. No. 12/340,567, filed Dec. 19, 2008, eight pages.

(Continued)

*Primary Examiner* — Nan-Ying Yang
(74) *Attorney, Agent, or Firm* — Kubota & Basol LLP

(57) ABSTRACT

A touch screen is disclosed that includes conductive elements in a display area and connecting traces for routing the conductive elements to other locations. The connecting traces can be routed underneath or over existing opaque structures in the display area, instead of in border areas adjacent to the display area, to minimize the effect of the connecting traces on the display aperture ratio. The lengths and/or widths of these connecting traces as well as the number of parallel connecting traces used to connect to a particular element can be selected to balance the load on the drive and/or sense circuitry and on display pixels caused by the connecting traces.

24 Claims, 6 Drawing Sheets

(56) References Cited

U.S. PATENT DOCUMENTS

| | | |
|---|---|---|
| 5,105,186 A | 4/1992 | May |
| 5,483,261 A | 1/1996 | Yasutake |
| 5,488,204 A | 1/1996 | Mead et al. |
| 5,550,659 A | 8/1996 | Fujieda et al. |
| 5,680,187 A | 10/1997 | Nagayama et al. |
| 5,825,352 A | 10/1998 | Bisset et al. |
| 5,835,079 A | 11/1998 | Shieh |
| 5,838,308 A | 11/1998 | Knapp et al. |
| 5,844,644 A | 12/1998 | Oh et al. |
| 5,880,411 A | 3/1999 | Gillespie et al. |
| 6,057,903 A | 5/2000 | Colgan et al. |
| 6,177,918 B1 | 1/2001 | Colgan et al. |
| 6,188,391 B1 | 2/2001 | Seely et al. |
| 6,204,897 B1 | 3/2001 | Colgan et al. |
| 6,281,957 B1 | 8/2001 | Oh et al. |
| 6,310,610 B1 | 10/2001 | Beaton et al. |
| 6,323,846 B1 | 11/2001 | Westerman et al. |
| 6,483,498 B1 | 11/2002 | Colgan et al. |
| 6,501,529 B1 | 12/2002 | Kurihara et al. |
| 6,549,260 B1 | 4/2003 | Shibahara |
| 6,556,265 B1 | 4/2003 | Murade |
| 6,646,706 B2 | 11/2003 | Lim et al. |
| 6,646,707 B2 | 11/2003 | Noh et al. |
| 6,680,448 B2 | 1/2004 | Kawashima et al. |
| 6,690,387 B2 | 2/2004 | Zimmerman et al. |
| 6,762,815 B2 | 7/2004 | Lee |
| 6,975,379 B2 | 12/2005 | Kim et al. |
| 7,015,894 B2 | 3/2006 | Morohoshi |
| 7,042,444 B2 | 5/2006 | Cok |
| 7,133,032 B2 | 11/2006 | Cok |
| 7,184,064 B2 | 2/2007 | Zimmerman et al. |
| 7,202,856 B2 | 4/2007 | Cok |
| 7,230,608 B2 | 6/2007 | Cok |
| 7,280,167 B2 | 10/2007 | Choi et al. |
| 7,379,054 B2 | 5/2008 | Lee |
| 7,633,595 B2 | 12/2009 | Kim et al. |
| 7,663,607 B2 | 2/2010 | Hotelling et al. |
| 7,969,546 B2 | 6/2011 | Wu et al. |
| 8,144,295 B2 | 3/2012 | Chang et al. |
| 8,169,421 B2 | 5/2012 | Wright et al. |
| 8,294,865 B2 | 10/2012 | Chang et al. |
| 8,330,930 B2 | 12/2012 | Matsumori |
| 8,350,826 B2 | 1/2013 | Watanabe |
| 8,479,122 B2 | 7/2013 | Hotelling et al. |
| 8,497,967 B2 | 7/2013 | Chang et al. |
| 8,749,496 B2 | 6/2014 | Chang et al. |
| 8,866,787 B2 | 10/2014 | Chang et al. |
| 9,367,188 B2 | 6/2016 | Lee et al. |
| 10,268,295 B2 | 4/2019 | Yang |
| 2001/0013915 A1 | 8/2001 | Song |
| 2001/0020578 A1 | 9/2001 | Baier |
| 2001/0026347 A1 | 10/2001 | Sawasaki et al. |
| 2002/0084992 A1 | 7/2002 | Agnew |
| 2002/0159016 A1 | 10/2002 | Nishida et al. |
| 2004/0109097 A1 | 6/2004 | Mai |
| 2004/0114082 A1 | 6/2004 | Lee |
| 2004/0120200 A1 | 6/2004 | Gogl et al. |
| 2004/0141096 A1 | 7/2004 | Mai |
| 2004/0189587 A1 | 9/2004 | Jung et al. |
| 2005/0052582 A1 | 3/2005 | Mai |
| 2005/0140892 A1 | 6/2005 | Kim et al. |
| 2005/0231487 A1 | 10/2005 | Ming |
| 2005/0243023 A1 | 11/2005 | Reddy et al. |
| 2005/0243228 A1 | 11/2005 | Lee et al. |
| 2005/0264232 A1 | 12/2005 | Choi et al. |
| 2005/0270435 A1 | 12/2005 | Shiau et al. |
| 2006/0007165 A1 | 1/2006 | Yang et al. |
| 2006/0026521 A1 | 2/2006 | Hotelling et al. |
| 2006/0097991 A1 | 5/2006 | Hotelling et al. |
| 2006/0145365 A1 | 7/2006 | Halls et al. |
| 2006/0146033 A1 | 7/2006 | Chen et al. |
| 2006/0146034 A1 | 7/2006 | Chen et al. |
| 2006/0197753 A1 | 9/2006 | Hotelling |
| 2006/0203151 A1 | 9/2006 | Kim |
| 2006/0244736 A1 | 11/2006 | Tseng |
| 2007/0018969 A1 | 1/2007 | Chen et al. |
| 2007/0075977 A1 | 4/2007 | Chen et al. |
| 2007/0097278 A1 | 5/2007 | Rho et al. |
| 2007/0176905 A1 | 8/2007 | Shih et al. |
| 2007/0216657 A1 | 9/2007 | Konicek |
| 2007/0262967 A1 | 11/2007 | Rho |
| 2007/0291009 A1* | 12/2007 | Wright ............... G06F 3/044 345/173 |
| 2008/0048994 A1 | 2/2008 | Lee et al. |
| 2008/0055221 A1 | 3/2008 | Yabuta et al. |
| 2008/0055268 A1 | 3/2008 | Yoo et al. |
| 2008/0067528 A1 | 3/2008 | Choi et al. |
| 2008/0074401 A1 | 3/2008 | Chung et al. |
| 2008/0129898 A1 | 6/2008 | Moon |
| 2008/0136980 A1 | 6/2008 | Rho et al. |
| 2008/0150901 A1 | 6/2008 | Lowles et al. |
| 2008/0158172 A1 | 7/2008 | Hotelling et al. |
| 2008/0309627 A1 | 12/2008 | Hotelling et al. |
| 2008/0309633 A1 | 12/2008 | Hotelling et al. |
| 2009/0256816 A1* | 10/2009 | Kim ............... G09G 3/3648 345/174 |
| 2009/0273577 A1 | 11/2009 | Chen et al. |
| 2009/0323007 A1 | 12/2009 | Shim |
| 2010/0001973 A1 | 1/2010 | Hotelling et al. |
| 2010/0123866 A1* | 5/2010 | Chang ............... G02F 1/136286 349/141 |
| 2010/0144391 A1* | 6/2010 | Chang ............... G02F 1/13338 455/566 |
| 2010/0149128 A1 | 6/2010 | No et al. |
| 2010/0165278 A1 | 7/2010 | Matsumori et al. |
| 2010/0277425 A1 | 11/2010 | Choi et al. |
| 2011/0012845 A1 | 1/2011 | Rothkopf et al. |
| 2011/0074705 A1 | 3/2011 | Yousefpor et al. |
| 2011/0222016 A1 | 9/2011 | Kaneko et al. |
| 2011/0248949 A1 | 10/2011 | Chang et al. |
| 2011/0298731 A1 | 12/2011 | Fu et al. |
| 2012/0019473 A1 | 1/2012 | Edwards |
| 2012/0068944 A1* | 3/2012 | Oh ............... G02F 1/13338 345/173 |
| 2012/0092273 A1* | 4/2012 | Lyon ............... G06F 3/0412 345/173 |
| 2012/0154731 A1 | 6/2012 | Chang et al. |
| 2012/0206395 A1 | 8/2012 | Misaki |
| 2012/0206402 A1 | 8/2012 | Park et al. |
| 2013/0045762 A1 | 2/2013 | Chang et al. |
| 2013/0063891 A1 | 3/2013 | Martisauskas |
| 2013/0093721 A1 | 4/2013 | Nakamura et al. |
| 2013/0113734 A1 | 5/2013 | Cho et al. |
| 2013/0113752 A1 | 5/2013 | Chang et al. |
| 2013/0329150 A1 | 12/2013 | Kim |
| 2014/0028618 A1 | 1/2014 | Chang et al. |
| 2014/0139480 A1 | 5/2014 | Seo et al. |
| 2014/0240286 A1 | 8/2014 | Chang et al. |
| 2015/0338951 A1 | 11/2015 | Lee et al. |
| 2016/0004346 A1* | 1/2016 | Zhao ............... G06F 3/0412 345/174 |
| 2016/0282997 A1 | 9/2016 | Lee et al. |
| 2017/0038876 A1 | 2/2017 | Yang et al. |

FOREIGN PATENT DOCUMENTS

| | | |
|---|---|---|
| CN | 203422722 U | 2/2014 |
| CN | 203480484 U | 3/2014 |
| EP | 1 133 057 A2 | 9/2001 |
| EP | 1 133 057 A3 | 9/2001 |
| EP | 1 133 057 B1 | 9/2001 |
| EP | 1 422 601 A1 | 5/2004 |
| EP | 1 455 264 A2 | 9/2004 |
| EP | 1 455 264 A3 | 9/2004 |
| EP | 1 939 673 A1 | 7/2008 |
| GB | 2 456 221 A | 7/2009 |
| GB | 2 475 054 A | 5/2011 |
| JP | 07-036017 A | 2/1995 |
| JP | 2000-163031 A | 6/2000 |
| JP | 2002-342033 A | 11/2002 |
| JP | 2010-152188 A | 7/2010 |
| KR | 2000-0062978 A | 10/2000 |
| KR | 10-2001-0083106 A | 8/2001 |

(56) References Cited

FOREIGN PATENT DOCUMENTS

| | | |
|---|---|---|
| KR | 10-2005-0070367 A | 7/2005 |
| KR | 10-2008-0091909 A | 10/2008 |
| WO | WO-85/03374 A1 | 8/1985 |
| WO | WO-2004/046905 A2 | 6/2004 |
| WO | WO-2004/046905 A3 | 6/2004 |
| WO | WO-2005/036510 A1 | 4/2005 |
| WO | WO-2007/146785 A2 | 12/2007 |
| WO | WO-2007/146785 A3 | 12/2007 |
| WO | WO-2010/065424 A2 | 6/2010 |
| WO | WO-2010/065424 A3 | 6/2010 |
| WO | WO-2013/184597 A1 | 12/2013 |
| WO | WO-2015/160377 A1 | 10/2015 |
| WO | WO-2015/183334 A1 | 12/2015 |

OTHER PUBLICATIONS

Final Office Action dated Aug. 22, 2012, for U.S. Appl. No. 12/315,869, filed Dec. 5, 2008, 13 pages.
Final Office Action dated Nov. 19, 2014, for U.S. Appl. No. 13/605,918, filed Sep. 6, 2012, eight pages.
Final Office Action dated Nov. 24, 2015, for U.S. Appl. No. 13/605,918, filed Sep. 6, 2012, seven pages.
International Search Report dated Nov. 12, 2010, for PCT Application No. PCT/US2009/065978, four pages.
International Search Report dated Sep. 17, 2013, for PCT Application No. PCT/US2013/043938, filed Jun. 3, 2013, five pages.
International Search Report dated Dec. 15, 2014, for PCT Application No. PCT/US14/57032, filed Sep. 23, 2014, three pages.
International Search Report dated Jan. 22, 2015, for PCT Application No. PCT/US14/58701, filed Oct. 1, 2014, two pages.
Kanda, E. et al. (2008). "55.2: Integrated Active Matrix Capacitive Sensors for Touch Panel LTPS-TFT LCDs," *SID 08 Digest*, pp. 834-837.
Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Lee, S. et al. (Oct. 2, 2002). "Ultra-FFS TFT-LCD with Super Image Quality, Fast Response Time, and Strong Pressure-Resistant Characteristics," *Journal of SID* pp. 117-122.
Non-Final Office Action dated Feb. 14, 2011, for U.S. Appl. No. 12/340,567, filed Dec. 19, 2008, nine pages.
Non-Final Office Action dated May 15, 2012, for U.S. Appl. No. 12/315,869, filed Dec. 5, 2008, 14 pages.
Non-Final Office Action dated Dec. 3, 2012, for U.S. Appl. No. 13/656,580, filed Oct. 19, 2012, seven pages.
Non-Final Office Action dated Oct. 23, 2013, for U.S. Appl. No. 12/315,869, filed Dec. 5, 2008, six pages.
Non-Final Office Action dated May 23, 2014, for U.S. Appl. No. 13/605,918, filed Sep. 6, 2012, seven pages.
Non-Final Office Action dated Jul. 9, 2014, for U.S. Appl. No. 14/268,911, filed May 2, 2014, six pages.
Non-Final Office Action dated May 6, 2015, for U.S. Appl. No. 13/605,918, filed Sep. 6, 2012, eight pages.
Non-Final Office Action dated Aug. 10, 2015, for U.S. Appl. No. 14/286,718, filed May 23, 2014, eleven pages.
Non-Final Office Action dated Oct. 15, 2015, for U.S. Appl. No. 13/605,918, filed Sep. 6, 2012, seven pages.
Notice of Allowance dated Jan. 17, 2012, for U.S. Appl. No. 12/340,567, filed Dec. 19, 2008, 10 pages.
Notice of Allowance dated Aug. 6, 2012, for U.S. Appl. No. 13/405,226, filed Feb. 24, 2012, seven pages.
Notice of Allowance dated Apr. 30, 2013, for U.S. Appl. No. 13/656,580, filed Oct. 19, 2012, nine pages.
Notice of Allowance dated Feb. 7, 2014, for U.S. Appl. No. 12/315,869, filed Dec. 5, 2008, five pages.
Notice of Allowance dated Aug. 13, 2014, for U.S. Appl. No. 14/268,911, filed May 2, 2014, five pages.
Notice of Allowance dated Feb. 12, 2016, for U.S. Appl. No. 14/286,718, filed May 23, 2014, nine pages.
Notice of Allowance dated Mar. 8, 2016, for U.S. Appl. No. 14/286,718, filed May 23, 2014, six pages.
Notice of Allowance dated Mar. 25, 2016, for U.S. Appl. No. 14/286,718, filed May 23, 2014, six pages.
Notice of Allowance dated Mar. 30, 2016, for U.S. Appl. No. 13/605,918, filed Sep. 6, 2012, five pages.
ROC (Taiwan) search report dated Mar. 26, 2015, for TW Patent Application No. 102119986, with English translation, two pages.
Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.
Rubine, D.H. (May 1992). "Combining Gestures and Direct Manipulation," CHI '92, pp. 659-660.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
Non-Final Office Action dated Feb. 28, 2018, for U.S. Appl. No. 15/304,494, filed Oct. 14, 2016, nine pages.
Non-Final Office Action dated Jun. 14, 2018, for U.S. Appl. No. 15/179,763, filed Jun. 10, 2016, seven pages.
Final Office Action dated Jan. 14, 2019, for U.S. Appl. No. 15/179,763, filed Jun. 10, 2016, eight pages.
Notice of Allowance dated Dec. 5, 2018, for U.S. Appl. No. 15/304,494, filed Oct. 14, 2016, nine pages.
Notice of Allowance dated Mar. 1, 2019, for U.S. Appl. No. 15/179,763, filed Jun. 10, 2016, eight pages.
Advisory Action received for U.S. Appl. No. 12/315,869, dated Nov. 8, 2012, 3 pages.
Advisory Action received for U.S. Appl. No. 12/340,567, dated Nov. 22, 2011, 2 pages.
Letter Restarting Period for Response received for U.S. Appl. No. 12/340,567, dated Nov. 16, 2010, 6 pages.
Restriction Requirement received for U.S. Appl. No. 12/340,567, dated Sep. 28, 2010, 6 pages.
Restriction Requirement received for U.S. Appl. No. 15/179,763, dated Jan. 4, 2018, 6 pages.

\* cited by examiner

NARROW BORDER TOUCH SCREEN

CROSS-REFERENCES TO RELATED APPLICATIONS

This application is a National Phase application under 35 U.S.C. § 371 of International Application No. PCT/US2014/057032, filed Sep. 23, 2014, which claims priority to U.S. Provisional Patent Application No. 62/004,093, filed May 28, 2014, the contents of which are hereby incorporated by references in their entirety for all intended purposes.

FIELD OF THE DISCLOSURE

This relates generally to touch screens, and more particularly, to touch screens in which connecting traces for elements in an active area of the touch screen are routed in the active area rather than in a border area in order to narrow the border area of the touch screen.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel or integrated with the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface.

Capacitive touch sensor panels can be formed by a matrix of substantially transparent conductive elements made of materials such as Indium Tin Oxide (ITO). It is due in part to their substantial transparency that capacitive touch sensor panels can be overlaid on a display to form a touch screen, as described above. In addition, some touch screens can be formed by partially integrating touch sensing circuitry into a display pixel stackup (i.e., the stacked material layers forming the display pixels). Some elements in an active area (the display area) of the touch screen may need to be routed to particular edges of the touch screen using connecting traces in order to provide for off-panel or other connections. However, routing these connecting traces in opaque border areas of the touch screen may cause these border areas to be wide, which can reduce the optical aperture of the touch screen.

SUMMARY OF THE DISCLOSURE

Some capacitive touch sensor panels can be formed as a matrix of substantially transparent conductive elements made of material such as Indium Tin Oxide (ITO), and some touch screens can be formed by partially integrating touch sensing circuitry into a display pixel stackup (i.e., the stacked material layers forming the display pixels). The conductive elements can be electrically connected to drive and/or sense circuitry using connecting traces.

In some examples of the disclosure, the connecting traces can be routed underneath or over existing structures in an active area of the display, instead of in border areas adjacent to the active area of the display, to minimize the effect of the connecting traces on the display aperture ratio. The lengths and/or widths of these connecting traces as well as the number of parallel connecting traces used to connect to a particular element can be selected to balance the load on the drive and/or sense circuitry and on display pixels caused by the connecting traces. The connecting traces can be formed in a separate conductive material layer, and can be connected to the elements through vias in a separate insulating layer.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Some capacitive touch sensor panels can be formed as a matrix of substantially transparent conductive elements made of material such as Indium Tin Oxide (ITO), and some touch screens can be formed by partially integrating touch sensing circuitry into a display pixel stackup (i.e., the stacked material layers forming the display pixels). The conductive elements can be electrically connected to drive and/or sense circuitry using connecting traces.

In some examples of the disclosure, the connecting traces can be routed underneath or over existing structures in an active area of the display, instead of in border areas adjacent to the active area of the display, to minimize the effect of the connecting traces on the display aperture ratio. The lengths and/or widths of these connecting traces as well as the number of parallel connecting traces used to connect to a particular element can be selected to balance the load on the drive and/or sense circuitry and on display pixels caused by the connecting traces. The connecting traces can be formed in a separate conductive material layer, and can be connected to the elements through vias in a separate insulating layer.

Figure 1C:
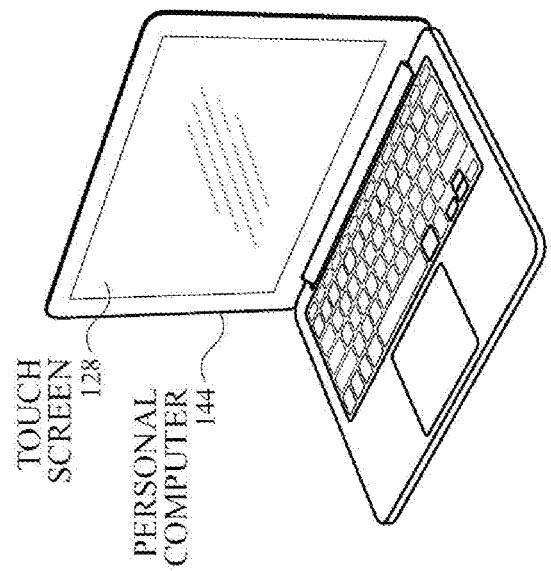
FIGS. 1A-1C illustrate an example mobile telephone, an example media player, and an example portable computing device that can each include an exemplary touch screen according to examples of the disclosure.
Figure 1B:
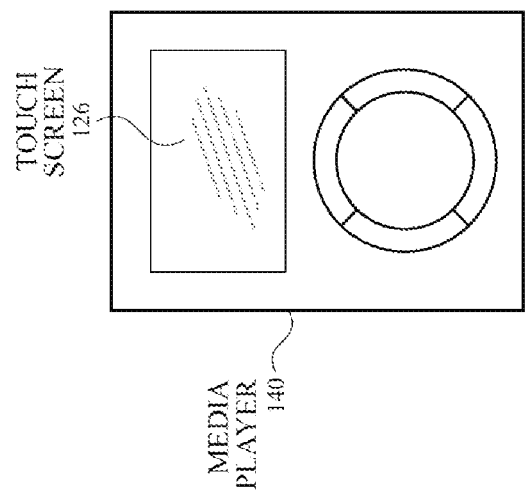
Figure 1A:
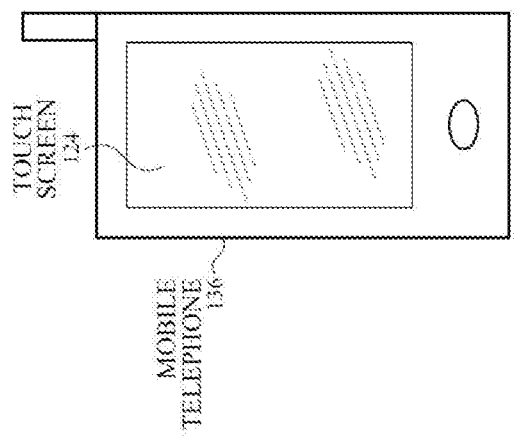

FIGS. 1A-1C show example systems in which a touch screen according to examples of the disclosure may be implemented. FIG. 1A illustrates an example mobile telephone 136 that includes a touch screen 124. FIG. 1B illustrates an example digital media player 140 that includes a touch screen 126. FIG. 1C illustrates an example portable computing device 144 that includes a touch screen 128. It is understood that the above touch screens can be implemented in other devices as well, including in wearable devices.

Touch screens 124, 126 and 128 can be based on self-capacitance or mutual capacitance. A self-capacitance based touch system can include small plates of conductive material that can be referred to as touch pixels or touch pixel electrodes. During operation, the touch pixel can be stimulated with an AC waveform and the self-capacitance of the touch pixel can be measured. As an object approaches the touch pixel, the self-capacitance of the touch pixel can change. This change in the self-capacitance of the touch pixel can be detected and measured by the touch sensing system to determine the positions of multiple objects when they touch, or come in proximity to, the touch screen.

A mutual capacitance based touch system can include drive and sense lines that may cross over each other on different layers, or may be adjacent to each other on the same layer. The crossing or adjacent locations can be referred to as touch pixels or touch pixel electrodes. During operation, the drive line can be stimulated with an AC waveform and the mutual capacitance of the touch pixel can be measured. As an object approaches the touch pixel, the mutual capacitance of the touch pixel can change. This change in the mutual capacitance of the touch pixel can be detected and measured by the touch sensing system to determine the positions of multiple objects when they touch, or come in proximity to, the touch screen. In some examples, a touch screen can be multi-touch, single touch, projection scan, full-imaging multi-touch, capacitive touch, etc.

Figure 2:
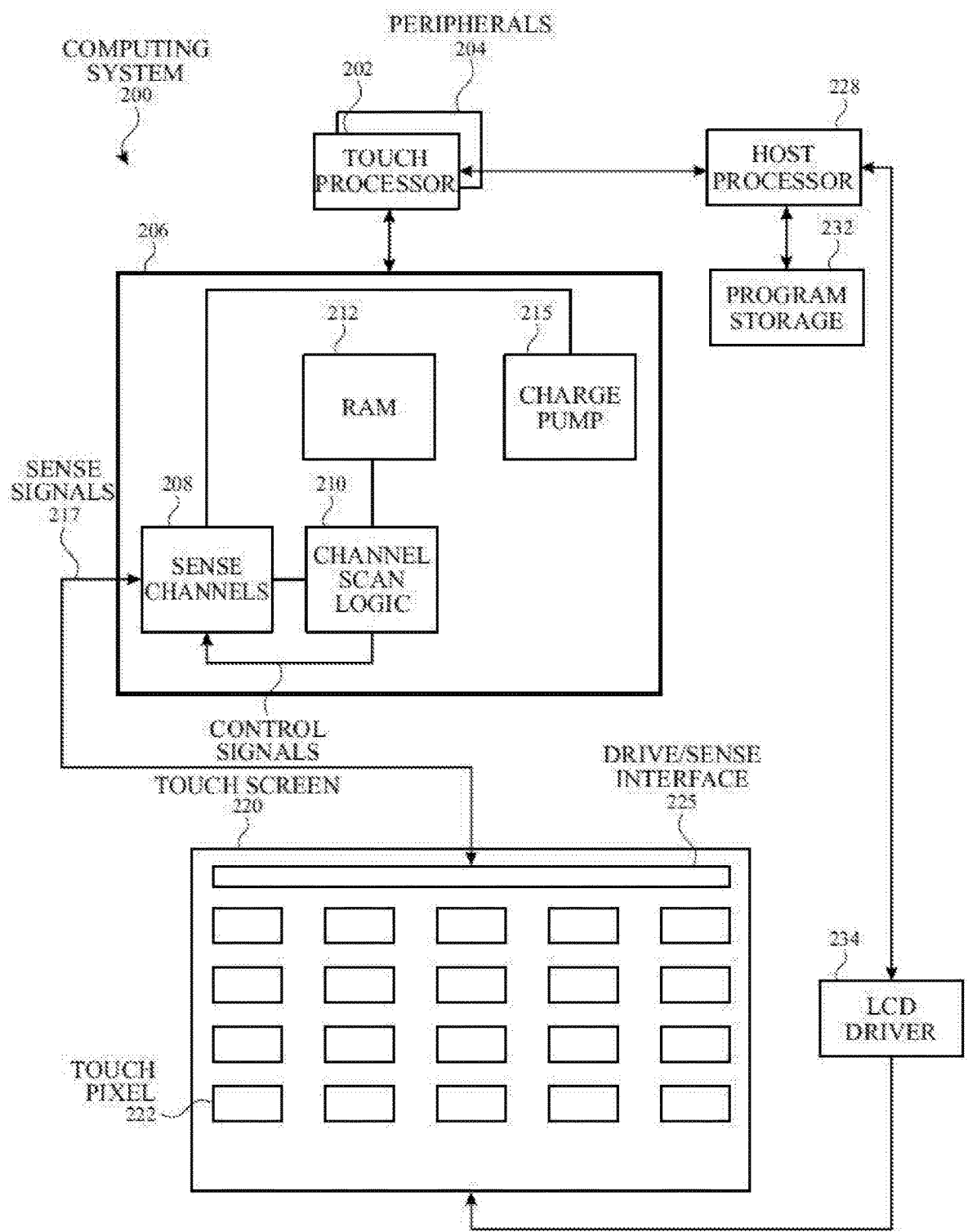
FIG. 2 is a block diagram of an exemplary computing system that illustrates one implementation of an example touch screen according to some examples of the disclosure.

FIG. 2 is a block diagram of an example computing system 200 that illustrates one self-capacitance implementation of an example touch screen 220 according to examples of the disclosure, although it should be understood that a mutual capacitance computing system could be employed as well. Computing system 200 can be included in, for example, mobile telephone 136, digital media player 140, portable computing device 144, or any mobile or non-mobile computing device that includes a touch screen, including a wearable device. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208 and channel scan logic 210. Channel scan logic 210 can access RAM 212, autonomously read data from sense channels 208 and provide control for the sense channels. In addition, channel scan logic 210 can control sense channels 208 to generate stimulation signals at various frequencies and phases that can be selectively applied to the touch pixels of touch screen 220, as described in more detail below. In some examples, touch controller 206, touch processor 202 and peripherals 204 can be integrated into a single application specific integrated circuit (ASIC), and in some examples can be integrated with touch screen 220 itself.

Touch screen 220 can include touch sensing circuitry that can include a capacitive sensing medium having a plurality of touch pixels 222. Touch pixels 222 can be coupled to sense channels 208 in touch controller 206, can be driven by stimulation signals from the sense channels through drive/sense interface 225, and can be sensed by the sense channels through the drive/sense interface as well, as described above. Labeling the conductive plates used to detect touch (i.e., touch pixels 222) as "touch pixels" can be particularly useful when touch screen 220 is viewed as capturing an "image" of touch. In other words, after touch controller 206 has determined an amount of touch detected at each touch pixel 222 in touch screen 220, the pattern of touch pixels in the touch screen at which a touch occurred can be thought of as an "image" of touch (e.g., a pattern of fingers touching the touch screen).

Computing system 200 can also include a host processor 228 for receiving outputs from touch processor 202 and performing actions based on the outputs. For example, host processor 228 can be connected to program storage 232 and a display controller, such as an LCD driver 234. The LCD driver 234 can provide voltages on select (gate) lines to each pixel transistor and can provide data signals along data lines to these same transistors to control the pixel display image as described in more detail below. Host processor 228 can use LCD driver 234 to generate an image on touch screen 220, such as an image of a user interface (UI), and can use touch processor 202 and touch controller 206 to detect a touch on or near touch screen 220. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Note that one or more of the functions described above, including the configuration of switches, can be performed by firmware stored in memory (e.g., one of the peripherals 204 in FIG. 2) and executed by touch processor 202, or stored in program storage 232 and executed by host processor 228.

The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Figure 3:
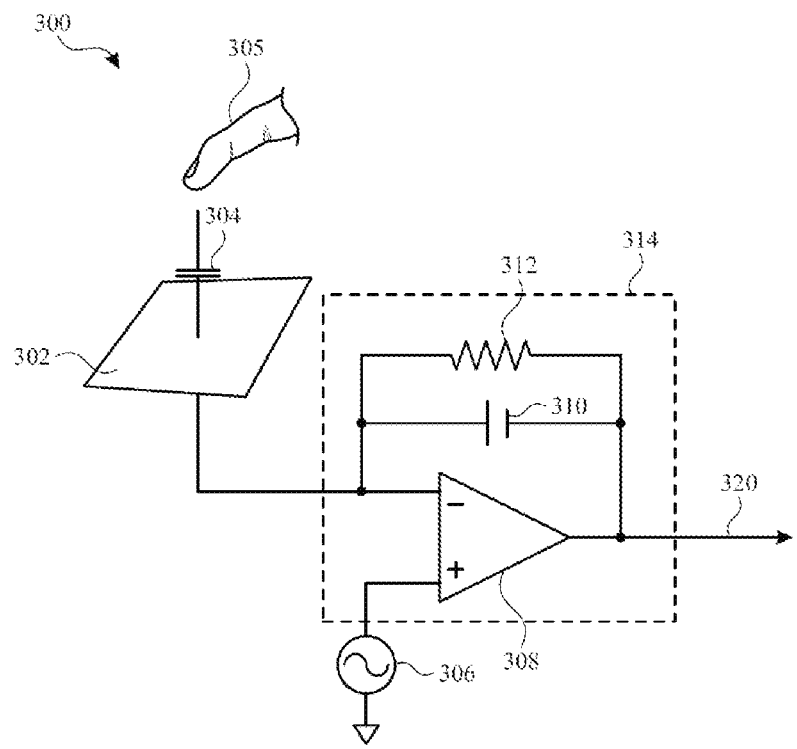
FIG. 3 illustrates an exemplary touch sensor circuit corresponding to a self-capacitance touch pixel electrode and sensing circuit according to some examples of the disclosure.

FIG. 3 illustrates an exemplary touch sensor circuit 300 corresponding to a self-capacitance touch pixel electrode 302 and sensing circuit 314 according to examples of the disclosure, although it should be understood that a mutual capacitance touch pixel and sensing circuit could be employed as well. Touch pixel electrode 302 can correspond to touch pixel 222. Touch pixel electrode 302 can have an inherent self-capacitance to ground associated with it, and also an additional self-capacitance to ground that is formed when an object, such as finger 305, is in proximity to or touching the electrode. The total self-capacitance to ground of touch pixel electrode 302 can be illustrated as capacitance 304. Touch pixel electrode 302 can be coupled to sensing circuit 314. Sensing circuit 314 can include an operational amplifier 308, feedback resistor 312, feedback capacitor 310 and an input voltage source 306, although other configurations can be employed. For example, feedback resistor 312 can be replaced by a switched capacitor resistor in order to minimize any parasitic capacitance effect caused by a variable feedback resistor. Touch pixel electrode 302 can be coupled to the inverting input of operational amplifier 308. An AC voltage source 306 (Vac) can be coupled to the non-inverting input of operational amplifier 308. Touch sensor circuit 300 can be configured to sense changes in the total self-capacitance 304 of the touch pixel electrode 302 induced by a finger or object either touching or in proximity to the touch sensor panel. Output 320 can be used by a processor to determine the presence of a proximity or touch event, or the output can be inputted into a discrete logic network to determine the presence of a touch or proximity event.

Figure 4:
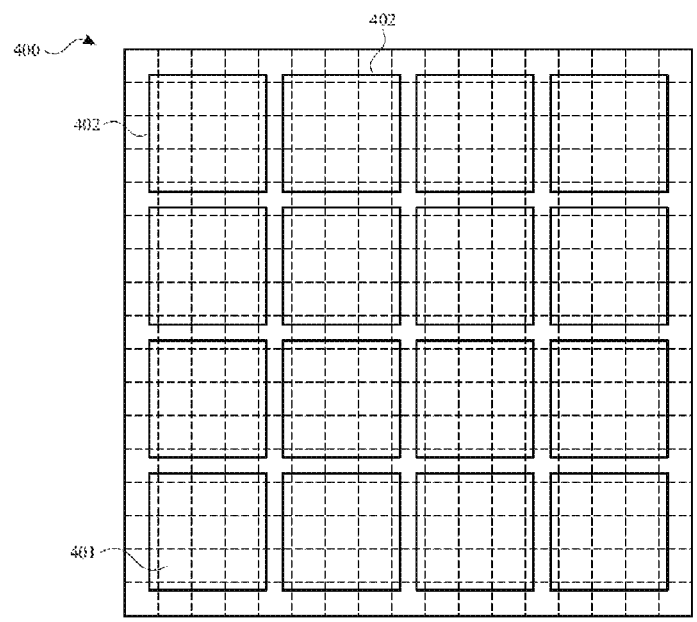
FIG. 4 illustrates an example configuration in which common electrodes can form portions of the touch sensing circuitry of a touch sensing system according to some examples of the disclosure.

Referring back to FIG. 2, in some examples, touch screen 220 can be an integrated touch screen in which touch sensing circuit elements of the touch sensing system can be integrated into the display pixel stackups of a display, although it should be understood that non-integrated touch screens could be employed as well. The circuit elements in touch screen 220 can include, for example, elements that can exist in LCD or other displays, such as one or more pixel transistors (e.g., thin film transistors (TFTs)), gate lines, data lines, pixel electrodes and common electrodes. In any given display pixel, a voltage between a pixel electrode and a common electrode can control a luminance of the display pixel. The voltage on the pixel electrode can be supplied by a data line through a pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor. FIG. 4 illustrates an example configuration in which common electrodes 402 can form portions of the touch sensing circuitry of a touch sensing system—in some examples of this disclosure, the common electrodes can form touch pixels used to detect an image of touch on touch screen 400, as described above. Each common electrode 402 (i.e., touch pixel) can include a plurality of display pixels 401, and each display pixel 401 can include a portion of a common electrode 402, which can be a circuit element of the display system circuitry in the pixel stackup (i.e., the stacked material layers forming the display pixels) of the display pixels of some types of LCD or other displays that can operate as part of the display system to display an image.

In the example shown in FIG. 4, each common electrode 402 can serve as a multi-function circuit element that can operate as display circuitry of the display system of touch screen 400 and can also operate as touch sensing circuitry of the touch sensing system. In this example, each common electrode 402 can operate as a common electrode of the display circuitry of the touch screen 400, as described above, and can also operate as touch sensing circuitry of the touch screen. For example, a common electrode 402 can operate as a capacitive part of a touch pixel of the touch sensing circuitry during the touch sensing phase. Other circuit elements of touch screen 400 can form part of the touch sensing circuitry by, for example, switching electrical connections, etc. More specifically, in some examples, during the touch sensing phase, a gate line can be connected to a power supply, such as a charge pump, that can apply a voltage to maintain TFTs in display pixels included in a touch pixel in an "off" state. Stimulation signals can be applied to common electrode 402. Changes in the total self-capacitance of common electrode 402 can be sensed through an operational amplifier, as previously discussed. The change in the total self-capacitance of common electrode 402 can depend on the proximity of a touch object, such as finger 305, to the common electrode. In this way, the measured change in total self-capacitance of common electrode 402 can provide an indication of touch on or near the touch screen.

In general, each of the touch sensing circuit elements may be either a multi-function circuit element that can form part of the touch sensing circuitry and can perform one or more other functions, such as forming part of the display circuitry, or may be a single-function circuit element that can operate as touch sensing circuitry only. Similarly, each of the display circuit elements may be either a multi-function circuit element that can operate as display circuitry and perform one or more other functions, such as operating as touch sensing circuitry, or may be a single-function circuit element that can operate as display circuitry only. Therefore, in some examples, some of the circuit elements in the display pixel stackups can be multi-function circuit elements and other circuit elements may be single-function circuit elements. In other examples, all of the circuit elements of the display pixel stackups may be single-function circuit elements.

In addition, although examples herein may describe the display circuitry as operating during a display phase, and describe the touch sensing circuitry as operating during a touch sensing phase, it should be understood that a display phase and a touch sensing phase may be operated at the same time, e.g., partially or completely overlap, or the display phase and touch sensing phase may operate at different times. Also, although examples herein describe certain circuit elements as being multi-function and other circuit elements as being single-function, it should be understood that the circuit elements are not limited to the particular functionality in other examples. In other words, a circuit element that is described in one example herein as a single-function circuit element may be configured as a multi-function circuit element in other examples, and vice versa.

The common electrodes 402 (i.e., touch pixels) and display pixels 401 of FIG. 4 are shown as rectangular or square regions on touch screen 400. However, it is understood that the common electrodes 402 and display pixels 401 are not limited to the shapes, orientations, and positions shown, but can include any suitable configurations according to examples of the disclosure.

As described above, the self-capacitance of each common electrode 402 (i.e., touch pixel) in touch screen 400 can be sensed to capture an image of touch across touch screen 400. Although not shown in FIG. 4, in mutual capacitance examples, the drive lines can be stimulated by one or stimulation signals, and the sense lines can be sensed to capture the image of touch. To allow for the sensing of the self-capacitance of individual common electrodes 402 in self-capacitance examples, or the driving and sensing of drive and sense lines in mutual capacitance examples, it can be necessary to route one or more electrical connections between each of the common electrodes (or drive and sense lines) and the touch circuitry (e.g., drive and sense circuitry).

In some example touch screen designs, connectivity between elements in the active area (the display area) of the touch screen and other areas such as off-panel connection areas is provided in the border areas of the touch screen, where non-transparent, lower resistance materials such as copper can be used. However, as the size and resolution of touch screens increases, the width of the border area needed to route all of the traces needed to connect the elements in the active area can increase, leading to undesirably wide border areas that reduce the area available for the touch screen and therefore the optical aperture.

Figure 5:
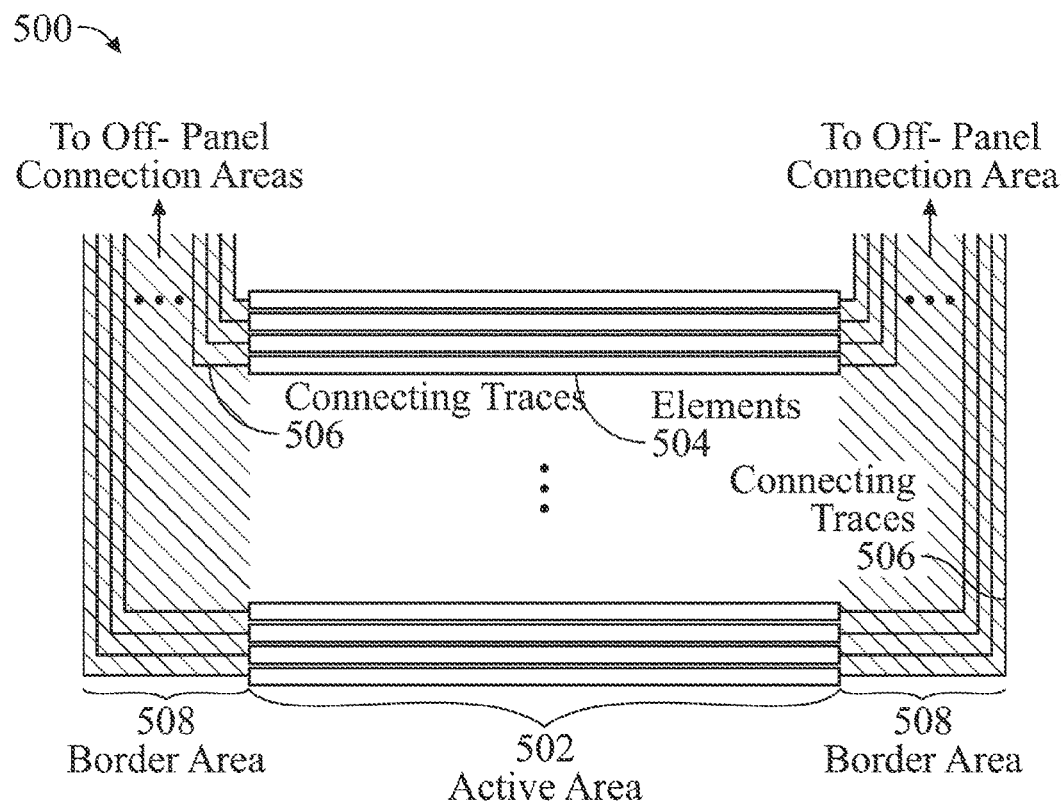
FIG. 5 illustrates an exemplary touch screen display with connecting traces routed in the border area according to some examples of the disclosure.

FIG. 5 illustrates an exemplary touch screen display 500 with connecting traces routed in the border area according to some examples of the disclosure. In the example of FIG. 5, active area 502 can represent the portion of the touch screen that is capable of displaying images and also receiving touch or proximity input. Within the active area 502, elements 504 can be formed. Elements 504 can be drive lines, sense lines, ground guards, or other structures that may need to be routed to an area of the touch screen for off-panel connections or other purposes. In the example of FIG. 5, connecting traces 506 can be coupled to elements 504 and routed in border areas 508 to off-panel connection areas or other areas (not shown in FIG. 5). However, as the resolution of touch screens increases and more elements are located in the active area 502, the required number of connecting traces 506 can increase, which can require a wider border area 508. Furthermore, as the size of touch screens increases, the length of the connecting traces 506 can increase, which can undesirably increase the resistance of those traces. To keep trace resistance low, the width of connecting traces 506 can be increased, but that can also result in a wider border area 502. A wider border area can undesirably reduce the optical aperture of the touch screen display and provide an unaesthetic appearance.

Figure 6:
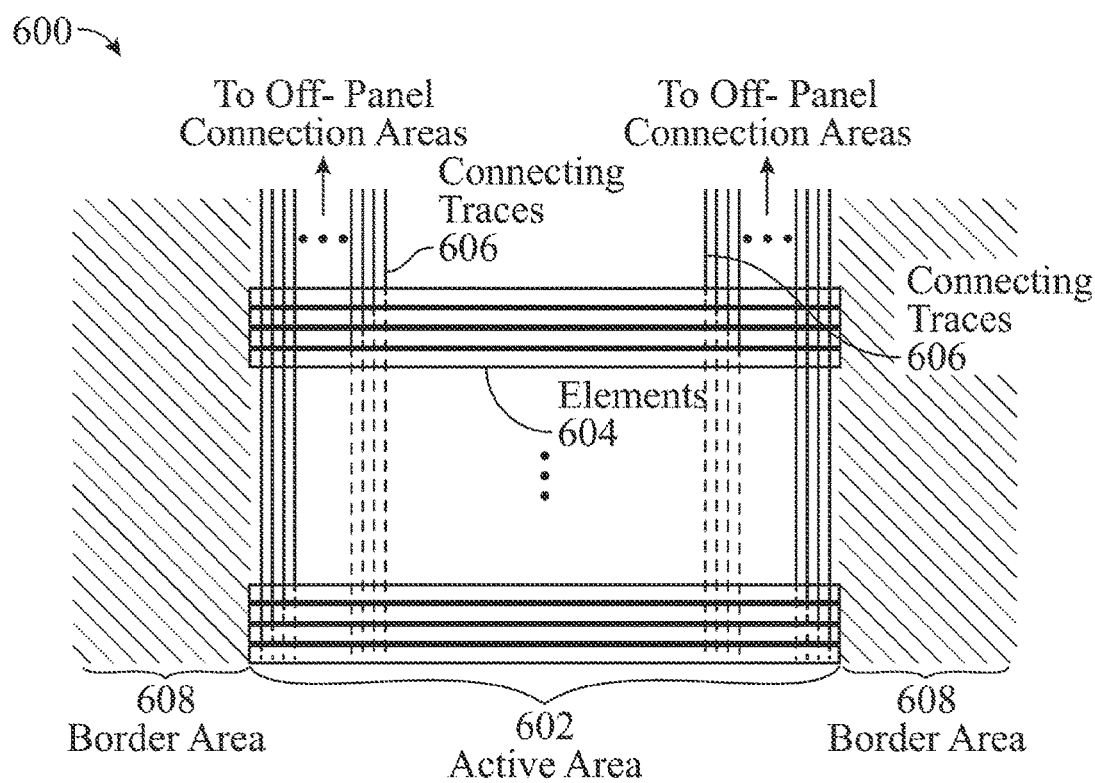
FIG. 6 illustrates another exemplary touch screen display with connecting traces routed in the active area according to some examples of the disclosure.

FIG. 6 illustrates another exemplary touch screen display 600 with connecting traces routed in the active area according to some examples of the disclosure. FIG. 6 can represent an integrated display and touch (a.k.a. in-cell touch) example, where touch sensing elements are integrated with display elements, and in some cases configurable multi-function elements are utilized, but it should be understood that the disclosure is not limited to an in-cell touch configuration. In the example of FIG. 6, connecting traces 606 can be coupled to elements 604 and routed in the active area 602 to off-panel connection areas or other areas (not shown in FIG. 6). In the example of FIG. 6, the elements 604 can be drive lines formed from connected Vcom segments (e.g., common electrodes used for both touch and display operations), and connectivity can be provided at both ends of the drive lines, but it should be understood that in some examples, the elements 604 can be any conductive material that needs to be routed to areas outside of the active area 602, and both ends need not be connected. By routing the connecting traces 606 in the active area, the width of border areas 608 can be reduced significantly, or in some examples, the border areas can be eliminated altogether. In some examples, the connecting traces 606 can be formed from non-transparent metals such as copper to keep line widths smaller and resistance lower, but such connecting traces can reduce the optical aperture and uniformity of the touch screen display and create other undesirable optical artifacts. In some examples, the connecting traces 606 can be formed from transparent materials such as Indium Tin Oxide (ITO) to minimize the reduction in optical aperture and uniformity. However, the resistance of the connecting traces 606 can increase unless their widths are increased, which can counteract, to some extent, the improved optical aperture and uniformity.

Figure 7:
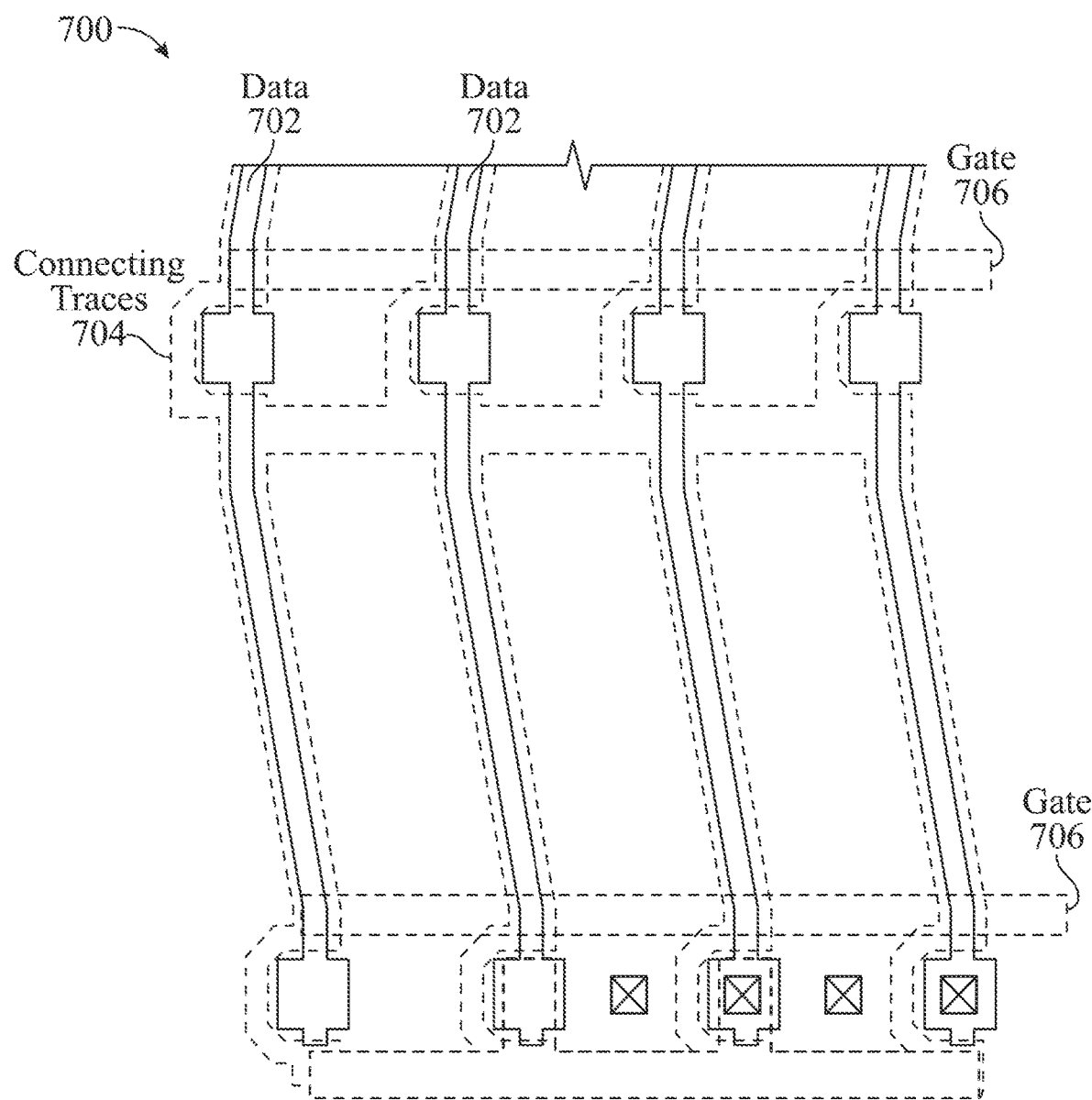
FIG. 7 illustrates a top view of an exemplary stackup of superimposed layers of a pixel layout according to some examples of the disclosure.

FIG. 7 illustrates a top view of an exemplary stackup 700 of superimposed layers of a pixel layout according to some examples of the disclosure. FIG. 7 illustrates an integrated display and touch (a.k.a. in-cell touch) example, where touch sensing elements are integrated with display elements, and in some cases configurable multi-function elements are utilized, but it should be understood that the disclosure is not limited to an in-cell configuration. In the example of FIG. 7, data lines 702 can be routed in the active area of the touch screen, and connecting traces 704 can be routed under the data lines 702. In this way, the addition of connecting traces 704 within the active area should not affect the optical aperture and uniformity of the touch screen. Gate lines 706 can be routed under the connecting traces 704. Although FIG. 7 shows the connecting traces 704 routed under data lines 702, in some examples the connecting traces can be routed under or over other opaque structures in the stackup. In some examples, connecting traces 704 can be formed of opaque metal such as copper, but in some examples, the connecting traces can be formed from transparent material such as ITO. In some examples where touch sensing circuitry is not integrated with display circuitry, the connecting traces 704 can be routed over opaque areas of the display circuitry, such as between sub-pixels, so as to not affect the optical aperture and uniformity of the touch screen.

Figure 8:
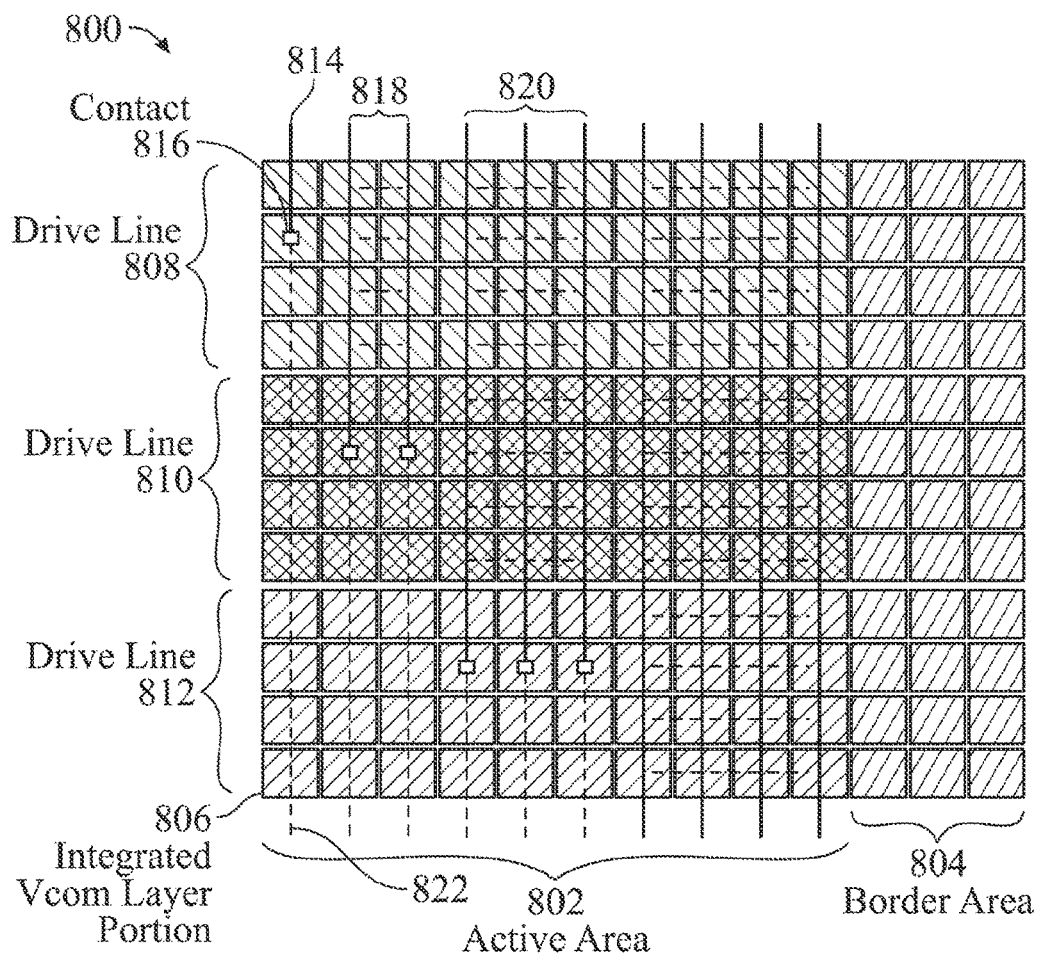
FIG. 8 illustrates a top view of an exemplary connection architecture according to some examples of the disclosure.

FIG. 8 illustrates a top view of an exemplary connection architecture 800 according to some examples of the disclosure. FIG. 8 illustrates an integrated display and touch example, but it should be understood that the disclosure is not limited to an integrated display and touch configuration. In the example of FIG. 8, a portion of the active area 802 is shown, and a portion of the border area 804 is shown. Active area 802 and border area 804 can be formed from multiple integrated Vcom layer portions 806, which can also form display pixels when configured as a display. The integrated Vcom layer portions 806 can be combined to form drive line 808, drive line 810, drive line 812, and border area 804, though it should be understood that in some examples of the disclosure, areas 808, 810 and 812 can generally represent any conductive elements within the active area. (Note that although the electrical connections between integrated Vcom layer portions 806 using bridges, for example, are not shown for purposes of simplifying the figure, it should be understood that like-shaded Vcom layer portions are electrically connected.)

In order to produce touch data that is as unaffected by layout considerations as possible, it can be advantageous to form connecting traces whose resistances are substantially similar, so that the resistive loads seen by connected circuitry can be substantially the same. However, trace resistances can vary based on trace widths and lengths. In the example of FIG. 8, drive line portion 808 can be routed to off-panel connection areas, touch detection circuitry or other areas or circuits (not shown) using a single connecting trace 814, which can be coupled to drive line portion 808 using contact 816. Because connecting trace 814 is relatively short, its resistance can be relatively low. Drive line portion 810 can be routed using two connecting traces 818 which can be coupled to drive line portion 810 using two contacts. Because connecting traces 818 are longer than connecting trace 814, if traces 814 and 818 have the same width, their individual resistances can be higher than that of single connecting trace 814. However, because there are two connecting traces 818, the two connecting traces effectively halve the total resistance of the connection, making the total resistance of the two connecting traces more closely match that of single connecting trace 814. Similarly, the three connecting traces 820 for drive line 812 can make the total effective resistance of the connection more closely match that of connecting trace 814.

It should be understood that the number of connecting traces for each drive line shown in FIG. 8 is merely exemplary, and that other numbers of traces could be used in an attempt to equalize resistances. In addition, the connecting traces for a particular drive line need not be adjacent to each other. Furthermore, in some examples of the disclosure, the lengths of individual connecting traces can vary in an attempt to equalize resistances. For example, connecting trace 814 can make contact with drive line 808 at the lowest integrated Vcom layer portion (i.e., the fourth one down, instead of the second one down) to create additional length. In some examples of the disclosure, the widths of the individual connecting traces can vary in an attempt to equalize resistances. Any of these variations can be employed individually or in combination in an attempt to equalize the resistances between the drive lines and the off-panel connection areas, touch detection circuitry or other areas or circuits.

In addition, in order to produce touch data and/or display images that are as unaffected by layout considerations as possible, it can be advantageous to form connecting traces whose capacitances are substantially similar, so that the capacitive loads or coupling seen by connected or nearby circuitry can be substantially the same. However, trace capacitances can vary based on trace widths and lengths. Thus, in the example of FIG. 8, the connecting traces can extend beyond their contact point so that each connecting trace has approximately the same length. These extensions or dummy traces are shown at 822. The bottom ends of these extensions can be left unconnected, so that little or no current flows in the extensions and the resistances of the connecting traces can be substantially unchanged. However, because the total lengths of these connecting traces are approximately equal, their capacitances can be approximately equal. Furthermore, in some examples of the disclosure, the lengths of individual connecting traces can vary in an attempt to equalize capacitances. For example, individual extensions 822 can extend beyond their contact points by varying amounts, to create varying lengths. In some examples of the disclosure, the widths of the individual connecting traces can vary in an attempt to equalize capacitances. Any of these variations can be employed individually or in combination in an attempt to equalize the capacitances of the connecting traces between the drive lines and the off-panel connection areas, touch detection circuitry or other areas or circuits.

By making the resistive and capacitive loads approximately equal, connected circuits can experience the same resistive-capacitive loading, and the effects of the resulting RC time constant on the signals being driven by, or received by, the connected circuits can be approximately equalized. In addition, by routing the connecting traces over most or all of the Vcom layer portions 806 and the stackups formed therefrom (e.g., over most or all of the display pixel stackups), even if the connecting traces do not make direct electrical contact with the stackups, each stackup can be fabricated similarly, and experience the same artifacts. For example, because each display pixel stackup can have a connecting trace routed within, each display pixel can experience similar parasitic capacitive coupling resulting from the connecting trace.

Figure 9:
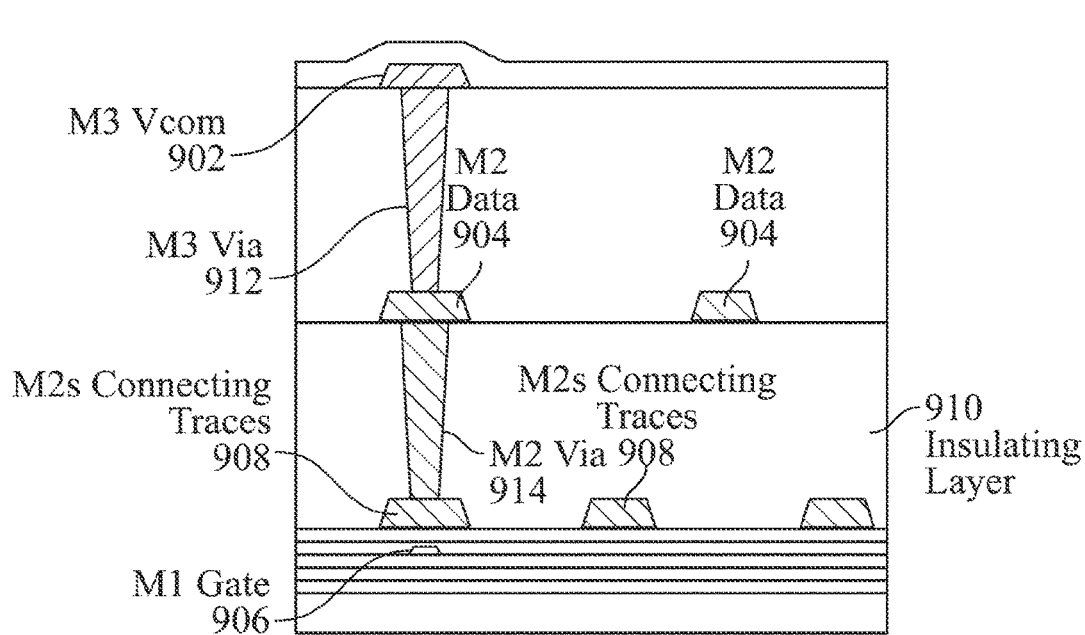
FIG. 9 illustrates an exemplary cross-section of an active area of a touch screen according to some examples of the disclosure.

FIG. 9 illustrates an exemplary cross-section of an active area 900 of a touch screen according to some examples of the disclosure. FIG. 9 illustrates an integrated display and touch example, but it should be understood that the disclosure is not limited to an integrated display and touch configuration. Note also that FIG. 9 is intended to show representative structures, and not an actual cross-section of a working example. In the example of FIG. 9, the Vcom layer 902 can be formed from a "Metal 3" (M3) layer, data lines 904 can be formed from a "Metal 2" (M2) layer, and gate lines 906 can be formed from a "Metal 1" (M1) layer. Connecting traces 908 can be formed from a "Metal 2s" (M2s) layer. Insulating layer 910 can be formed to support the connecting traces 908. M3 via 912 is shown as an example of a connection that can be made between the Vcom and data layer, and M2 via 914 is shown as an example of a connection that can be made between the data layer and the connecting trace layer.

Therefore, according to the above, some examples of the disclosure are directed to a touch screen comprising: a plurality of elements formed in a display area of the touch screen; and a plurality of connecting traces coupled to the plurality of elements and routed in the display area; wherein the plurality of connecting traces are configured to substantially balance a load created by the connecting traces, and substantially not affect an aperture ratio of the touch screen.

Additionally or alternatively to one or more of the examples disclosed above, in some examples, one or more first connecting traces coupled to a first element are configured such that a total resistance of the one or more first connecting traces substantially matches a total resistance of one or more second connecting traces coupled to a second element. Additionally or alternatively to one or more of the examples disclosed above, in some examples, a length of the one or more first connecting traces is selected such that the total resistance of the one or more first connecting traces substantially matches the total resistance of the one or more second connecting traces. Additionally or alternatively to one or more of the examples disclosed above, in some examples, a width of the one or more first connecting traces is selected such that the total resistance of the one or more first connecting traces substantially matches the total resistance of the one or more second connecting traces. Additionally or alternatively to one or more of the examples disclosed above, in some examples, one or more first connecting traces coupled to a first element are configured such that a total capacitance of the one or more first connecting traces substantially matches a total capacitance of one or more second connecting traces coupled to a second element. Additionally or alternatively to one or more of the examples disclosed above, in some examples, the touch screen further comprises a trace extension coupled to each of the one or more first connecting traces, the trace extensions configured such that the total capacitance of the one or more first connecting traces substantially matches the total capacitance of the one or more second connecting traces. Additionally or alternatively to one or more of the examples disclosed above, in some examples, a length of the trace extensions is selected such that the total capacitance of the one or more first connecting traces substantially matches the total capacitance of the one or more second connecting traces. Additionally or alternatively to one or more of the examples disclosed above, in some examples, a width of the trace extensions is selected such that the total capacitance of the one or more first connecting traces substantially matches the total capacitance of the one or more second connecting traces. Additionally or alternatively to one or more of the examples disclosed above, in some examples, each of the plurality of elements are formed from a plurality of display pixel stackups; and wherein the plurality of connecting traces are configured to equalize an effect of the connecting traces on the plurality of display pixel stackups. Additionally or alternatively to one or more of the examples disclosed above, in some examples, the touch screen further comprises: a data layer; a gate layer; and a connecting trace layer formed between the data layer and the gate layer; wherein the plurality of connecting traces are formed in the connecting trace layer. Additionally or alternatively to one or more of the examples disclosed above, in some examples, the plurality of connecting traces are configured to maximize an aperture ratio of the touch screen. Additionally or alternatively to one or more of the examples disclosed above, in some examples, at least one of the plurality of connecting traces is routed under an opaque area of the display area. Additionally or alternatively to one or more of the examples disclosed above, in some examples, at least one of the plurality of connecting traces is routed under a data line in the data layer.

Some examples of the disclosure are directed to a method of forming a touch screen comprising: routing a plurality of elements formed in a display area of the touch screen to a second area using a plurality of connecting traces routed in the display area; and forming the plurality of connecting traces to substantially balance a load created by the connecting traces, and substantially not affect an aperture ratio of the touch screen. Additionally or alternatively to one or more of the examples disclosed above, in some examples, the method further comprises matching a total resistance of one or more first connecting traces coupled to a first element with a total resistance of one or more second connecting traces coupled to a second element. Additionally or alternatively to one or more of the examples disclosed above, in some examples, the method further comprises selecting a length of the one or more first connecting traces such that the total resistance of the one or more first connecting traces substantially matches the total resistance of the one or more second connecting traces. Additionally or alternatively to one or more of the examples disclosed above, in some examples, the method further comprises selecting a width of the one or more first connecting traces such that the total resistance of the one or more first connecting traces substantially matches the total resistance of the one or more second connecting traces. Additionally or alternatively to one or more of the examples disclosed above, in some examples, the method further comprises matching a total capacitance of one or more first connecting traces coupled to a first element with a total capacitance of one or more second connecting traces coupled to a second element. Additionally or alternatively to one or more of the examples disclosed above, in some examples, the method further comprises extending each of the one or more first connecting traces such that the total capacitance of the one or more first connecting traces substantially matches the total capacitance of the one or more second connecting traces. Additionally or alternatively to one or more of the examples disclosed above, in some examples, the method further comprises selecting a length of the trace extensions such that the total capacitance of the one or more first connecting traces substantially matches the total capacitance of the one or more second connecting traces. Additionally or alternatively to one or more of the examples disclosed above, in some examples, the method further comprises selecting a width of the trace extensions such that the total capacitance of the one or more first connecting traces substantially matches the total capacitance of the one or more second connecting traces. Additionally or alternatively to one or more of the examples disclosed above, in some examples, the method further comprises: forming each of the plurality of elements from a plurality of display pixel stackups; and forming the connecting traces to equalize an effect of the connecting traces on the plurality of display pixel stackups. Additionally or alternatively to one or more of the examples disclosed above, in some examples, the method further comprises forming the plurality of connecting traces between a data layer and a gate layer. Additionally or alternatively to one or more of the examples disclosed above, in some examples, the method further comprises forming the plurality of connecting traces to maximize an aperture ratio of the touch screen. Additionally or alternatively to one or more of the examples disclosed above, in some examples, the method further comprises routing at least one of the plurality of connecting traces under an opaque area of the display area.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A touch screen comprising:
    a data layer;
    a plurality of electrodes formed in a display area of the touch screen, wherein the plurality of electrodes are configured to operate as at least touch-sensing electrodes; and
    a plurality of connecting touch-sensing traces coupled to the plurality of electrodes and routed in the display area, wherein the plurality of connecting touch-sensing traces are configured to at least carry one or more signals between the plurality of electrodes and touch circuitry;
    wherein:
        at least one of the plurality of connecting touch-sensing traces is routed under a data line in the data layer that is configured to control a luminance of a display pixel, the data line disposed between the at least one of the plurality of connecting touch-sensing traces and an electrode of the plurality of electrodes to which the at least one connecting touch-sensing trace is coupled, wherein the electrode of the plurality of electrodes is electrically coupled to the at least one connecting touch-sensing trace using at least one via that is in contact with the at least one connecting touch-sensing trace.

2. The touch screen of claim 1, wherein one or more first connecting touch-sensing traces coupled to a first electrode are configured such that a total resistance of the one or more first connecting touch-sensing traces substantially matches a total resistance of one or more second connecting touch-sensing traces coupled to a second electrode.

3. The touch screen of claim 2, wherein a length of the one or more first connecting touch-sensing traces is selected such that the total resistance of the one or more first connecting touch-sensing traces substantially matches the total resistance of the one or more second connecting touch-sensing traces.

4. The touch screen of claim 2, wherein a width of the one or more first connecting touch-sensing traces is selected such that the total resistance of the one or more first connecting touch-sensing traces substantially matches the total resistance of the one or more second connecting touch-sensing traces.

5. The touch screen of claim 1, wherein one or more first connecting touch-sensing traces coupled to a first electrode are configured such that a total capacitance of the one or more first connecting touch-sensing traces substantially matches a total capacitance of one or more second connecting touch-sensing traces coupled to a second electrode.

6. The touch screen of claim 5, further comprising a trace extension coupled to each of the one or more first connecting touch-sensing traces, the trace extensions configured such that the total capacitance of the one or more first connecting touch-sensing traces substantially matches the total capacitance of the one or more second connecting touch-sensing traces.

7. The touch screen of claim 6, wherein a length of the trace extensions is selected such that the total capacitance of the one or more first connecting touch-sensing traces substantially matches the total capacitance of the one or more second connecting touch-sensing traces.

8. The touch screen of claim 6, wherein a width of the trace extensions is selected such that the total capacitance of the one or more first connecting touch-sensing traces substantially matches the total capacitance of the one or more second connecting touch-sensing traces.

9. The touch screen of claim 1:
    wherein each of the plurality of electrodes is formed from a plurality of display pixel stackups; and
    wherein the plurality of connecting touch-sensing traces are configured to equalize an effect of the connecting touch-sensing traces on the plurality of display pixel stackups.

10. The touch screen of claim 1, further comprising:
    a gate layer including one or more gate lines that are configured to control operation of one or more pixel transistors in the touch screen; and
    a connecting trace layer formed between the data layer and the gate layer;
    wherein the plurality of connecting touch-sensing traces are formed in the connecting trace layer.

11. The touch screen of claim 1, wherein at least one of the plurality of connecting touch-sensing traces is routed under an opaque area of the display area.

12. A method of forming a touch screen comprising:
    routing a plurality of electrodes formed in a display area of the touch screen to a second area using a plurality of connecting touch-sensing traces routed in the display area, wherein the plurality of electrodes are configured to operate as at least touch-sensing electrodes, and wherein the plurality of connecting touch-sensing traces are configured to at least carry one or more signals between the plurality of electrodes and touch circuitry; and
    routing at least one of the plurality of connecting touch-sensing traces under a data line in a data layer that is configured to control a luminance of a display pixel, the data line disposed between the at least one of the plurality of connecting touch-sensing traces and an electrode of the plurality of electrodes to which the at least one connecting touch-sensing trace is coupled, wherein the electrode of the plurality of electrodes is electrically coupled to the at least one connecting touch-sensing trace using at least one via that is in contact with the at least one connecting touch-sensing trace.

13. The method of claim 12, further comprising matching a total resistance of one or more first connecting touch-sensing traces coupled to a first electrode with a total resistance of one or more second connecting touch-sensing traces coupled to a second electrode.

14. The method of claim 13, further comprising selecting a length of the one or more first connecting touch-sensing traces such that the total resistance of the one or more first connecting touch-sensing traces substantially matches the total resistance of the one or more second connecting touch-sensing traces.

15. The method of claim 13, further comprising selecting a width of the one or more first connecting touch-sensing traces such that the total resistance of the one or more first connecting touch-sensing traces substantially matches the total resistance of the one or more second connecting touch-sensing traces.

16. The method of claim 12, further comprising matching a total capacitance of one or more first connecting touch-sensing traces coupled to a first electrode with a total capacitance of one or more second connecting touch-sensing traces coupled to a second electrode.

17. The method of claim 16, further comprising extending each of the one or more first connecting touch-sensing traces such that the total capacitance of the one or more first connecting touch-sensing traces substantially matches the total capacitance of the one or more second connecting touch-sensing traces.

18. The method of claim 17, further comprising selecting a length of the trace extensions such that the total capacitance of the one or more first connecting touch-sensing traces substantially matches the total capacitance of the one or more second connecting touch-sensing traces.

19. The method of claim 17, further comprising selecting a width of the trace extensions such that the total capacitance of the one or more first connecting touch-sensing traces substantially matches the total capacitance of the one or more second connecting touch-sensing traces.

20. The method of claim 12, further comprising:

forming each of the plurality of electrodes from a plurality of display pixel stackups; and forming the connecting touch-sensing traces to equalize an effect of the connecting touch-sensing traces on the plurality of display pixel stackups.

21. The method of claim 12, further comprising forming the plurality of connecting touch-sensing traces between the data layer and a gate layer including one or more gate lines that are configured to control operation of one or more pixel transistors in the touch screen.

22. The method of claim 12, further comprising routing at least one of the plurality of connecting touch-sensing traces under an opaque area of the display area.

23. The touch screen of claim 1, wherein the plurality of electrodes are configured to operate as at least display electrodes.

24. The touch screen of claim 1, wherein the plurality of connecting touch-sensing traces are formed of non-transparent materials.

* * * * *